United States Patent
Liu et al.

(10) Patent No.: US 12,289,691 B2
(45) Date of Patent: Apr. 29, 2025

(54) POWER HEADROOM REPORT FOR ADDITIONAL SRS

(71) Applicant: Lenovo (Beijing) Ltd., Beijing (CN)

(72) Inventors: Bingchao Liu, Changping District (CN); Chenxi Zhu, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 339 days.

(21) Appl. No.: 17/774,052

(22) PCT Filed: Nov. 7, 2019

(86) PCT No.: PCT/CN2019/116162
§ 371 (c)(1),
(2) Date: May 3, 2022

(87) PCT Pub. No.: WO2021/087837
PCT Pub. Date: May 14, 2021

(65) Prior Publication Data
US 2022/0369244 A1    Nov. 17, 2022

(51) Int. Cl.
*H04W 52/36* (2009.01)
(52) U.S. Cl.
CPC .................. *H04W 52/365* (2013.01)
(58) Field of Classification Search
CPC . H04W 52/365; H04W 52/367; H04W 72/21; H04L 25/0226; H04B 7/06966
See application file for complete search history.

(56) References Cited

U.S. PATENT DOCUMENTS

| | | | |
|---|---|---|---|
| 10,560,947 B2* | 2/2020 | Yang | H04W 56/0045 |
| 10,979,976 B1* | 4/2021 | Babaei | H04W 76/11 |
| 2018/0132197 A1* | 5/2018 | Lin | H04W 52/242 |
| 2019/0104477 A1 | 4/2019 | Molavianjazi et al. | |
| 2019/0313343 A1 | 10/2019 | Molavianjazi et al. | |
| 2020/0008162 A1* | 1/2020 | Dinan | H04W 52/365 |
| 2020/0120619 A1* | 4/2020 | Manolakos | H04W 52/54 |
| 2020/0221396 A1* | 7/2020 | Wang | H04W 52/146 |
| 2022/0217642 A1* | 7/2022 | Go | H04W 52/365 |
| 2022/0217654 A1* | 7/2022 | Kang | H04W 52/14 |
| 2022/0232488 A1* | 7/2022 | Liu | H04W 52/365 |
| 2023/0041866 A1* | 2/2023 | Yi | H04W 72/02 |

OTHER PUBLICATIONS

Ericsson, "Remaining details for additional SRS symbols", 3GPP TSG RAN WG1 Meeting #98bis, R1-1910892, Chongqing, China [retrieved Jun. 21 2022]. Retrieved from the Internet <https://www.3gpp.org/ftp/TSG_RAN/WG1_RL1/TSGR1_98b/Docs/>, Oct. 2019, 6 pages.

(Continued)

*Primary Examiner* — Andrew Wendell
(74) *Attorney, Agent, or Firm* — FIG. 1 Patents

(57) ABSTRACT

Methods and apparatuses for power headroom report for additional SRS are disclosed. A method at a UE comprises calculating a power headroom (PH) according to additional SRS if SRS is transmitted on the additional SRS symbol(s) in a normal subframe; and reporting at least one type of the PH calculated according to the additional SRS, Type-3 PH and Type-1 PH by a MAC CE.

17 Claims, 9 Drawing Sheets

(56) References Cited

OTHER PUBLICATIONS

Lenovo, et al., "Discussion of additional SRS symbols", 3GPP TSG RAN WG1 Meeting #97, R1-1906273, Reno, USA [retrieved Jun. 21 2022]. Retrieved from the Internet <https://www.3gpp.org/ftp/TSG_RAN/WG1_RL1/TSGR1_97/Docs/>., May 2019, 6 pages.

LTE, "Evolved Universal Terrestrial Radio Access (E-UTRA); Physical layer procedures", 3GPP TS 36.213 version 15.7.0 Release 15 [retrieved Jun. 28 2022]. Retrieved from the Internet <https://www.etsi.org/deliver/etsi_ts/136200_136299/136213/15.07.00_60/ts_136213v150700p.pdf>, Oct. 2019, 552 pages.

PCT/CN2019/116162, "International Preliminary Report on Patentability", PCT Application No. PCT/CN2019/116162, May 19, 2022, 6 pages.

PCT/CN2019/116162, "International Search Report and Written Opinion", PCT Application No. PCT/CN2019/116162, Jul. 28, 2020, 7 pages.

19951515.6, "Extended European Search Report", EP Application No. 19951515.6, Jul. 5, 2023, 11 pages.

LG Electronics, "Discussion on additional SRS symbols", 3GPP TSG RAN WG1 Meeting #98bis, R1-1910580, Chongqing, China [retrieved Aug. 30, 2023]. Retrieved from the Internet <https://www.3gpp.org/ftp/tsg_ran/WG1_RL1/TSGR1_98b/Docs>, Oct. 2019, 6 pages.

\* cited by examiner

POWER HEADROOM REPORT FOR ADDITIONAL SRS

FIELD

The subject matter disclosed herein generally relates to wireless communications and, more particularly, to methods and apparatuses for power headroom report for additional SRS.

BACKGROUND

The following abbreviations are herewith defined, some of which are referred to within the following description: Third Generation Partnership Project (3GPP), Frequency Division Duplex (FDD), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Physical Uplink Shared Channel (PUSCH), Physical Uplink Control Channel (PUCCH), Physical Downlink Control Channel (PDCCH), Sounding Reference Signal (SRS), SRS Resource Indicator (SRI), Downlink Control Information (DCI), Resource Block (RB), Time Division Duplex (TDD), Radio Resource Control (RRC), Media Access Control (MAC), power headroom (PH), power headroom report (PHR), Licensed-Assisted Access (LAA), Listen Before Talk (LBT), Maximum Power Reduction (MPR), Additional Maximum Power Reduction (A-MPR), Power Management Maximum Power Reduction (P-MPR), Uplink Pilot Time Slot (UpPTS).

SRS is transmitted on the uplink channel to allow the base station to estimate the state of the uplink channel. SRS transmission can also be used for uplink timing estimation as well as estimating downlink channel conditions assuming downlink and uplink channel reciprocity.

At present, enhancement to SRS capacity and coverage has been approved in LTE Release 16. More than one symbol in a normal subframe can be used for SRS transmission in LTE Release 16. The SRS transmitted at symbols other than the last symbol in a normal subframe is referred to as additional SRS and the symbols other than the last symbol in a normal subframe is referred as additional SRS symbols. Aperiodic SRS transmission in additional SRS symbol(s) can be configured in any symbols other than the last symbol in the normal subframe. SRS transmitted at the last symbol in a normal subframe is referred to as a legacy SRS. SRS introduced in Rel-14 LTE can also be transmitted in the UpPTS which is a special subframe and it is referred to as Rel-14 SRS.

Additional_SRS, legacy SRS and Rel-14 SRS can be transmitted in the same subframe with or without PUSCH/PUCCH. Hereinafter, PUSCH/PUCCH means PUSCH and/or PUCCH. When legacy SRS and/or additional SRS and/or Rel-14 SRS and/or PUSCH/PUCCH are configured for a SCell, a potential issue is how to report power headrooms of different types.

Extended PHR MAC control element is defined in Release 15. Type-2 and Type-1 PH are reported for the PCell, while Type-3 or Type-1 PH is selected to be reported for SCell depending on whether the higher layer parameter ul-Configuration-r14 is configured for this SCell. If the ul-Configuration-r14 is configured, it means that carrier switching based SRS, i.e. Rel-14 SRS without PUSCH/PUCCH is configured for this SCell, Type-3 PH is reported. Otherwise (i.e. the ul-Configuration-r14 is not configured), Type-1 PH is reported. Type-1 or Type-2 PH are calculated according to PUSCH/PUCCH and are defined in the Release 15 LTE specification TS36.213. Type-3 PH is calculated according to Rel-14 SRS and is defined in the Release 15 LTE specification TS36.213.

BRIEF SUMMARY

It is an object of the present application to propose methods and apparatuses for power headroom report for additional SRS.

In one embodiment, a method at a UE comprises calculating a power headroom (PH) according to additional SRS if SRS is transmitted on the additional SRS symbol(s) in a normal subframe; and reporting at least one type of the PH calculated according to the additional SRS, Type-3 PH and Type-1 PH by a MAC CE.

In some embodiment, the UE is configured with a LAA SCell for uplink transmissions. The method may further comprises receiving PDCCH or EPDCCH to schedule an aperiodic SRS transmission on the additional SRS symbols on the LAA SCell in subframe wherein the power headroom according to the additional SRS for subframe i is calculated assuming that the UE performs an aperiodic additional SRS transmission on the LAA SCell in subframe i irrespective of whether the UE can access the LAA SCell for the additional SRS transmission in subframe i.

In some embodiment, the PH calculated according to the additional SRS is reported for a SCell if additional SRS is configured for this SCell without PUSCH/PUCCH; Type-3 PH is reported for a SCell if additional SRS is not configured but ul-Configuration-r14 is configured for this SCell; and Type-1 PH is reported for a SCell if PUSCH/PUCCH is configured.

In some embodiment, Type-3 PH is reported for a SCell if ul-Configuration-r14 is configured for this SCell; the PH calculated according to the additional SRS is reported for a SCell if ul-Configuration-r14 is not configured but additional SRS is configured for this SCell without PUSCH/PUCCH; and Type-1 PH is reported for a SCell if PUSCH/PUCCH is configured.

In another embodiment, the PH calculated according to the additional SRS is reported for a SCell if additional SRS is configured for this SCell without PUSCH/PUCCH nor ul-Configuration-r14; both Type-3 PH and the PH calculated according to the additional SRS are reported for a SCell if both additional SRS and ul-Configuration-r14 are configured for this SCell without PUSCH/PUCCH; both the PH calculated according to the additional SRS and Type-1 PH are reported for a SCell if additional SRS is configured for this SCell with PUSCH/PUCCH; Type-3 PH is reported for a SCell if additional SRS is not configured but ul-Configuration-r14 is configured for this SCell; and Type-1 PH is reported for a SCell if additional SRS is not configured but PUSCH/PUCCH is configured for this SCell. In particular, when two PH values are reported for one SCell, at most one associated $P_{CMAX,c}$ field for one of or both PH values is reported.

In some embodiment, the calculated according to the additional SRS is calculated using $PH_{type3A,c}(i) = P_{CMAX,c}(i) - \{10 \log_{10}(M_{Addional\_SRS,c}) + P_{O\_Additional\_SRS,c} + \alpha_{Additional\_SRS,c} \cdot PL_c + f_{Additional\_SRS,c}(i)\}$ if the UE transmits additional SRS in a normal subframe i for serving cell c with frame structure Type-1 and/or Type-2 and/or Type-3; and using $PH_{type3A,c}(i) = \tilde{P}_{CMAX,c}(i) - \{P_{O\_Additional\_SRS,c} + \alpha_{Additional\_SRS,c} \cdot PL_c + f_{Additional\_SRS,c}(i)\}$ if the UE does not actually transmit the additional SRS.

In some embodiment, a UE comprises a processor configured to calculate a power headroom (PH) according to additional SRS if SRS is transmitted on the additional SRS symbol(s) in a normal subframe; and a transmitter configured to report at least one type of the PH calculated according to the additional SRS, Type-3 PH and Type-1 PH by a MAC CE.

In yet another embodiment, a method at a base unit, comprises configuring a UE with a LAA SCell for uplink transmissions; and receiving a report on power headroom (PH) for additional SRS, wherein the report includes at least one type of PH calculated according to the additional SRS, Type-3 PH and Type-1 PH.

In further embodiment, a base unit comprises a processor configured to configure a UE with a LAA SCell for uplink transmissions; and a receiver configured to receive a report on power headroom (PH) for additional SRS, wherein the report includes at least one type of PH calculated according to the additional SRS, Type-3 PH and Type-1 PH.

It will be appreciated by persons skilled in the art that the effects that could be achieved with the present disclosure are not limited to what has been particularly described hereinabove and the above and other effects that the present disclosure could achieve will be more clearly understood from the following detailed description.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

Figure 1:
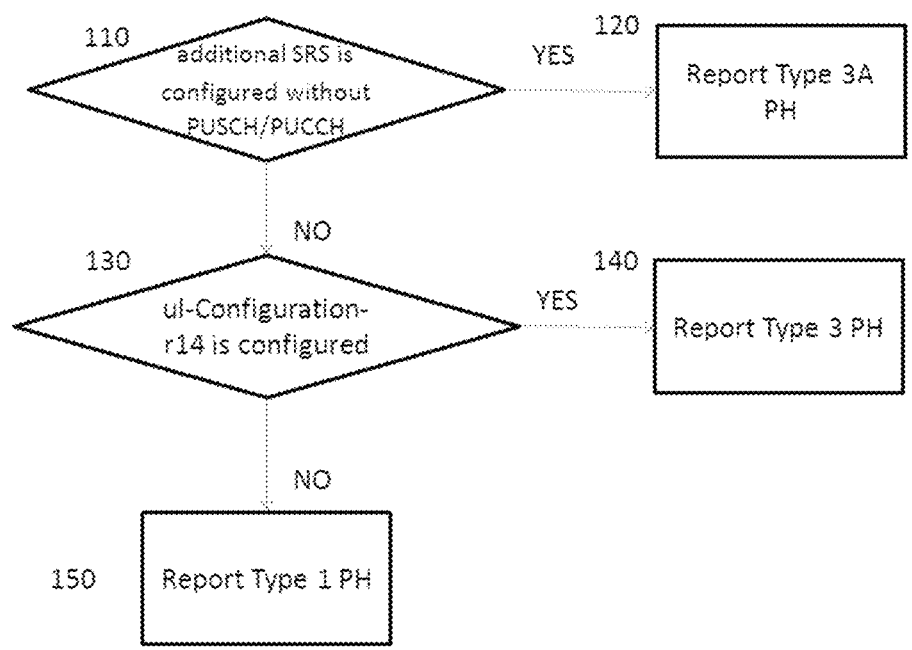
FIG. 1 illustrates Rule 1.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Licensed-Assisted Access (LAA) is a technology in which a carrier in authorized frequency bands serves as PCell while carriers in un-authorized frequency bands serve as SCells. For a LAA SCell, LBT (Listen Before Talk) channel access procedures are adopted. That is, only if the channel is idle (not used), the UE can actually use the channel for transmission. When a UE is scheduled to transmit PUSCH or SRS in a LAA SCell, LBT should be performed before the PUSCH or SRS transmission. If the UE cannot access the LAA SCell before the start symbol transmitting the PUSCH or SRS, the corresponding PUSCH or SRS should be dropped.

According to the present disclosure, if the UE is configured with a LAA SCell for uplink transmissions, and the UE receives PDCCH or EPDCCH to schedule an aperiodic SRS transmission on the additional SRS symbols on the LAA SCell in subframe i, power headroom for subframe i is calculated assuming that the UE performs an aperiodic additional SRS transmission on the LAA SCell in subframe i irrespective of whether the UE can access the LAA SCell for the additional SRS transmission in subframe i according to the LBT channel access procedures.

A new PH (Power Headroom) type, e.g. PH Type-3A, may be defined as follows:

If a UE transmits additional SRS in a normal subframe i for serving cell c with frame structure Type-1 and/or Type-2 and/or Type-3 with or without PUSCH/PUCCH, power headroom for a Type-3A report is calculated using $$PH_{type3A,c}(i)=P_{CMAX,c}(i)-\{10\log_{10}(M_{Additional\_SRS,c})+P_{O\_Additional\_SRS,c}+\alpha_{Additional\_SRS,c}\cdot PL_c+f_{Additional\_SRS,c}(i)\}[dB]$$

Otherwise (which means that the UE does not actually transmit the additional SRS, e.g. due to failure of LBT channel access procedures), power headroom for a Type-3A report is calculated using $$PH_{type3A,c}(i)=\tilde{P}_{CMAX,c}(i)-\{P_{O\_Additional\_SRS,c}+\alpha_{Additional\_SRS,c}\cdot PL_c+f_{Additional\_SRS,c}(i)\}[dB]$$

In the above equations, $P_{CMAX,c}(i)$ is the configured UE maximum transmit power in subframe i for serving cell c.

$P_{O\_Additional\_SRS,c}$ is a parameter composed of the sum of a component $P_{O\_Additional\_Normal\_SRS,c}$ and a component $P_{O\_UE\_Additionnl\_SRS,c}$ configured by the higher layer parameter p0-Nominal-additionalSRS and p0-UE-additionalSRS for additional SRS.

$M_{Additionnl\_SRS,c}$ is the bandwidth of the additional SRS transmission in subframe i for serving cell c expressed in number of RBs.

$\alpha_{Additionnl\_SRS,c}$ is the value of higher layer parameter alpha-additionalSRS configured by higher layers for serving cell c.

$PL_c$ is the downlink path loss estimate calculated in the UE for serving cell c in dB. $f_{Additional\_SRS,c}(i)$ is the current SRS power control adjustment state determined by the TPC command carried by DCI format 3/3A/3B.

$\tilde{P}_{CMAX,c}(i)$ is calculated assuming a SRS transmission in subframe i, and assuming MPR (Maximum Power Reduction)=0 dB, A-MPR (Additional Maximum Power Reduction)=0 dB, P-MPR (Power Management Maximum Power Reduction)=0 dB and $T_C$=0 dB. For this case, the physical layer delivers $\tilde{P}_{CMAX,c}(i)$ instead of $P_{CMAX,c}(i)$ to higher layers.

It can be seen from the above that the power headroom for a Type-3A report is calculated according to additional SRS.

As PH Type-3A is newly added, new rule for reporting power headroom is discussed.

Similar to Release 15, Type-2 and Type-1 PH are reported for the PCell. For SCell, Type-1 and/or Type-3 and/or Type-3A PH may be reported.

The Type-1 PH is calculated according to PUSCH/PUCCH. So, the Type-1 PH can be reported when PUSCH/PUCCH is transmitted. The Type-3 PH is calculated according to legacy SRS or the SRS transmitted in UpPTS. So, the Type-3 PH can be reported when SRS is transmitted in legacy SRS symbol or UpPTS. The Type-3A PH is calculated according to additional SRS. So, the Type-3A PH can be reported when additional SRS is transmitted.

According to a first embodiment, Rule 1 is applied. FIG. 1 illustrates Rule 1. In step 110, judging whether additional SRS is configured for a SCell without PUSCH/PUCCH. If the judge result of step 110 is YES, then Type-3A PH is reported in step 120. If the judge result of step 110 is NO, then in step 130, judging whether ul-Configuration-r14 is configured. If the judge result of step 130 is YES, then Type-3 PH is reported in step 140. If the judge result of step 130 is NO, then in step 150, Type-1 PH is reported.

| additional SRS | ul-Config-uration-r14 | PUSCH/PUCCH | PH to be reported |
|---|---|---|---|
| configured | configured | configured | Type-1 |
| configured | configured | not configured | Type-3A |
| configured | not configured | configured | Type-1 |
| configured | not configured | not configured | Type-3A |
| not configured | configured | configured | Type-1 |
| not configured | configured | not configured | Type-3 |
| not configured | not configured | configured | Type-1 |

Figure 2:
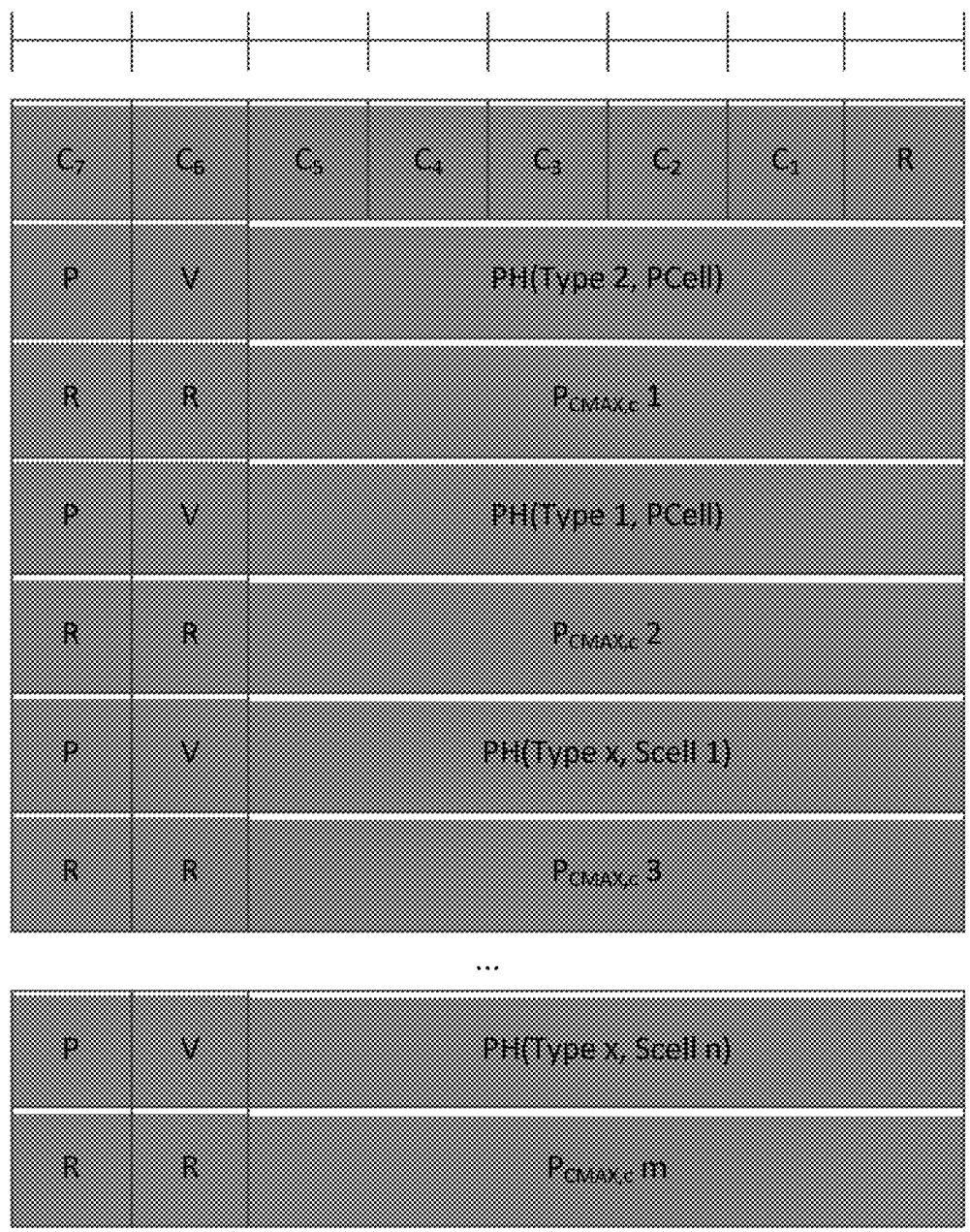
FIG. 2 illustrates an example of the Enhanced Extended PHR MAC CE format according to the first embodiment.

FIG. 2 illustrates an example of the Enhanced Extended PHR MAC CE format according to the first embodiment, in which Rule 1 is adopted.

In the example shown in FIG. 2, 8 serving cells are configured for the uplink transmission, in which one serving cell is PCell and the other seven (7) serving cells are SCells. The PHR MAC CE is identified by a MAC PDU subheader with dedicated LCID. It has a variable size.

The fields contained in Enhanced Extended PHR MAC CE are defined as follows:

$C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported.

R: reserved bit, set to "0".

V: this field indicates if the PH value is based on a real transmission or a reference format. For Type-1 PH, V=0 indicates real transmission on PUSCH and V=1 indicates that a PUSCH reference format is used. For Type-2 PH, V=0 indicates real transmission on PUCCH/SPUCCH and V=1 indicates that a PUCCH/SPUCCH reference format is used. For Type-3 PH, V=0 indicates real transmission on legacy SRS and V=1 indicates that an SRS reference format is used. For Type-3A PH, V=0 indicates real transmission on additional SRS and V=1 indicates that an SRS reference format is used. Furthermore, for Type-1, Type-2, Type-3 and Type-3A PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits, which suggests that 64 different power headroom levels can be defined.

P: this field indicates whether the MAC entity applies power backoff due to power management. The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}(i)$ used for calculation of the preceding PH field.

The first octet indicates the presence of PH per SCell.

When Type-2 PH is reported for the PCell, the following octet contains a "P" field, a "V" field and a Type-2 PH field. When the "V" field in the this octet is set to "0", the next octet contains the "$P_{CMAX,c}$" field for the calculation of the preceding PH field (i.e. the Type-2 PH field).

The following octet contains a "P" field, a "V" field and a Type-1 PH field for the PCell. If the "V" field in this octet is set to 0, the next octet contains the "$P_{CMAX,c}$" field for the calculation of the preceding PH field (i.e. the Type-1 PH field).

The following octets are for the TypexPH field for the SCell and the associated $P_{CMAX,c}$ field (if reported), in an ascending order based on the ServCellIndex (in the condition that associated $C_i$ field is set to "1"). According to the first embodiment, x is equal to 3A when additional SRS is configured for this SCell without PUSCH/PUCCH. If additional SRS is not configured but ul-Configuration-r14 is configured, then x is equal to 3. Otherwise (i.e. PUSCH/PUCCH is configured), x is equal to 1. Each Type×PH field for the SCell will be followed with an octet containing the associated $P_{CMAX,c}$ field if the "V" field contained in previous octet containing the Type×PH field is set to "1".

Figure 3:
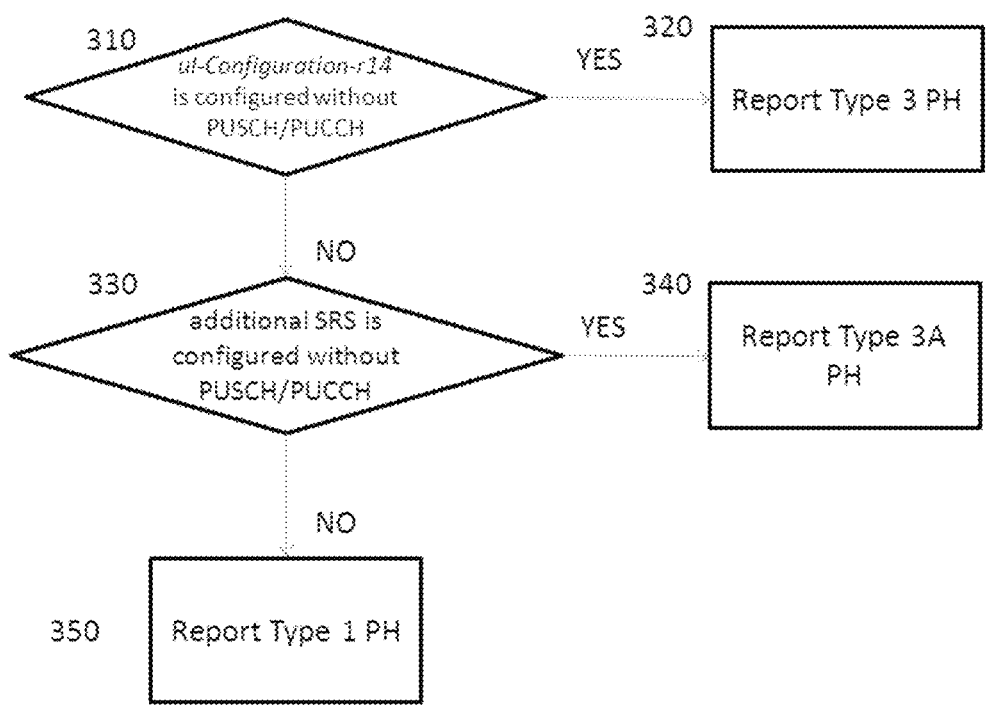
FIG. 3 illustrates Rule 2.

According to a second embodiment, Rule 2 is applied. FIG. 3 illustrates Rule 2. In step 310, judging whether ul-Configuration-r14 is configured for a SCell without PUSCH/PUCCH. If the judge result of step 310 is YES, then Type-3 PH is reported in step 320. If the judge result of step 310 is NO, then in step 330, judging whether additional SRS is configured without PUSCH/PUCCH. If the judge result of step 330 is YES, then Type-3A PH is reported in step 340. If the judge result of step 330 is NO, then in step 350, Type-1 PH is reported.

| additional SRS | ul-Configuration-r14 | PUSCH/PUCCH | PH to be reported |
|---|---|---|---|
| configured | configured | configured | Type-1 |
| configured | configured | not configured | Type-3 |
| configured | not configured | configured | Type-1 |
| configured | not configured | not configured | Type-3A |
| not configured | configured | configured | Type-1 |
| not configured | configured | not configured | Type-3 |
| not configured | not configured | configured | Type-1 |

Figure 4:
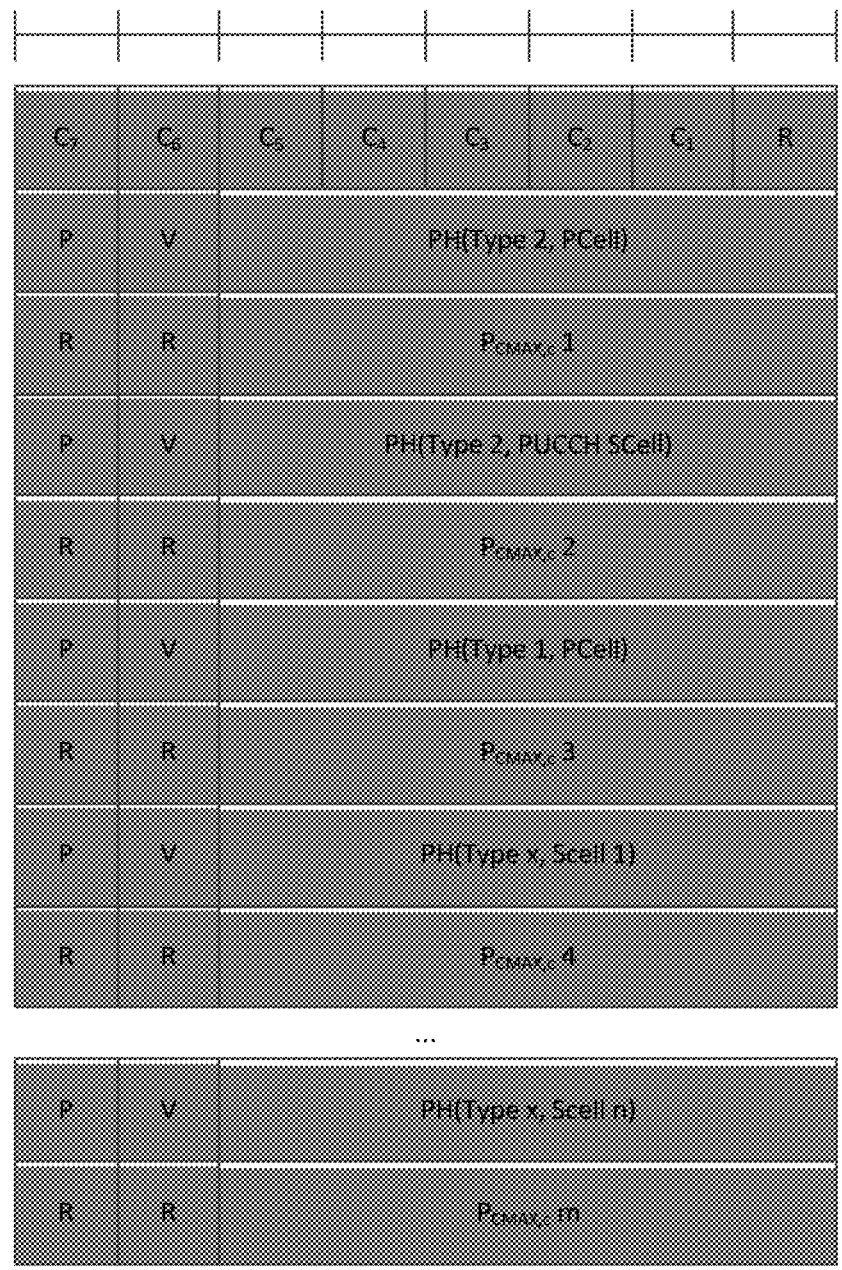
FIG. 4 illustrates an example of the Enhanced Extended PHR MAC CE format according to the second embodiment.

FIG. 4 illustrates an example of the Enhanced Extended PHR MAC CE format according to the second embodiment, in which Rule 2 is adopted.

In the example shown in FIG. 4, 8 serving cells are configured for the uplink transmission, in which one serving cell is PCell and the other seven (7) serving cells are SCells. In addition, PUCCH on SCell is supported. The PHR MAC CE is identified by a MAC PDU subheader with dedicated LCID. It has a variable size.

The definitions of the fields contained in Enhanced Extended PHR MAC CE shown in FIG. 4 are substantially the same as those described with reference to FIG. 2.

The first octet indicates the presence of PH per SCell. In the example of FIG. 4, the configured uplinks are 7 or less. If 8 or more uplinks are configured, four octets are used for indicating the presence of PH per SCell.

When Type-2 PH is reported for the PCell, the following octet contains a "P" field, a "V" field and a Type-2 PH field. When the "V" field in the this octet is set to "0", the next octet contains the "$P_{CMAX,c}$" field for the calculation of the preceding PH field (i.e. the Type-2 PH field)

The following octet contains a "P" field, a "V" field and a Type-2 PH field for the SCell. If the "V" field in this octet is set to 0, the next octet contains the "$P_{CMAX,c}$" field for the calculation of the preceding PH field (i.e. the Type-2 PH field for SCell).

The following octet contains a "P" field, a "V" field and a Type-1 PH field for the PCell. If the "V" field in this octet is set to 0, the next octet contains the "$P_{CMAX,c}$" field for the calculation of the preceding PH field (i.e. the Type-1 PH field for the PCell).

The following octets are for the Type×PH field for the SCell and the associated $P_{CMAX,c}$ field (if reported), in an ascending order based on the ServCellIndex (in the condition that associated $C_i$ field is set to 1). According to the second embodiment, x is equal to 3 when ul-Configuration-r14 is configured. If ul-Configuration-r14 is not configured but additional SRS is configured without PUSCH/PUCCH, then x is equal to 3A. Otherwise (i.e. PUSCH/PUCCH is configured), x is equal to 1. Each Type×PH field for the SCell will be followed with an octet containing the associated $P_{CMAX,c}$ field if the "V" field contained in previous octet containing the Type×PH field is set to "1".

Figure 5:
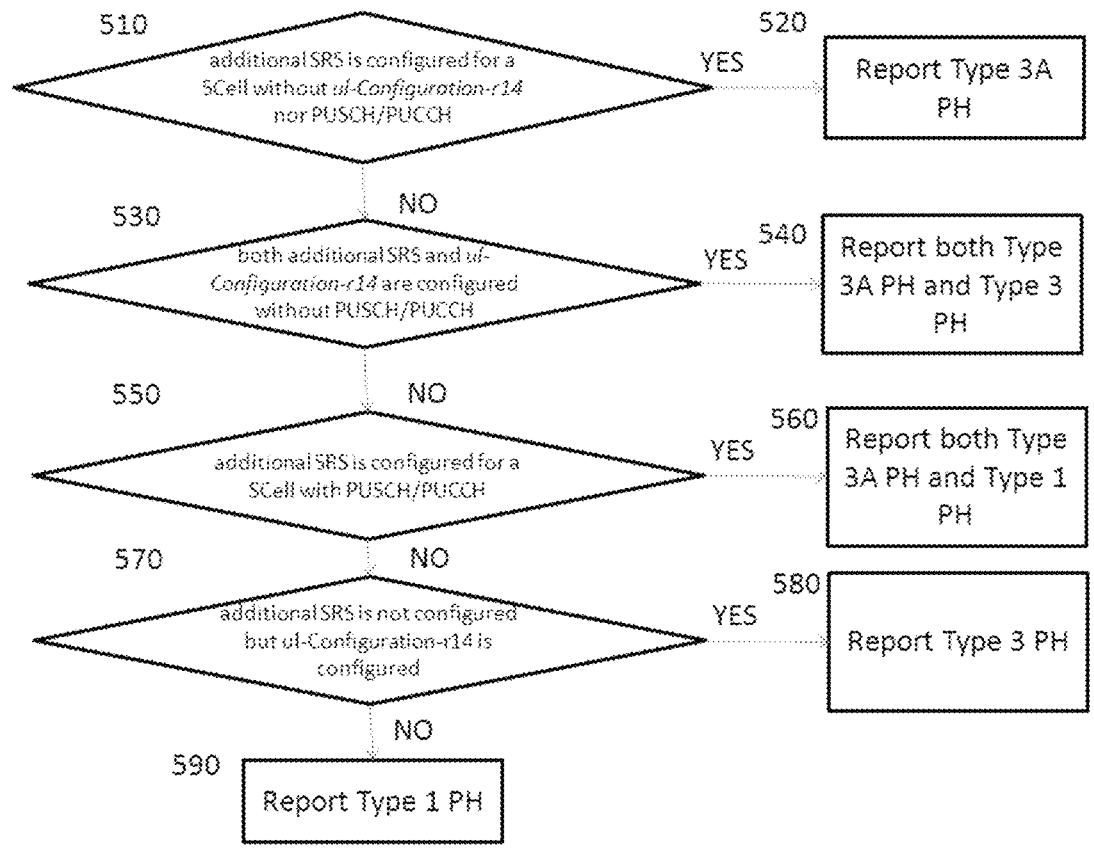
FIG. 5 illustrates Rule 3.

According to a third embodiment, Rule 3 is applied. FIG. 5 illustrates Rule 3.

In step 510, judging whether additional SRS is configured for a SCell without ul-Configuration-r14 nor PUSCH/PUCCH. If the judge result of step 510 is YES, then Type-3A PH is reported in step 520. If the judge result of step 510 is NO, then in step 530, judging whether both additional SRS and ul-Configuration-r14 are configured without PUSCH/PUCCH. If the judge result of step 530 is YES, then both Type-3A PH and Type-3 PH are reported in step 540. If the judge result of step 530 is NO, then in step 550, judging whether additional SRS is configured for a SCell with PUSCH/PUCCH. If the judge result of step 550 is YES, then both Type-3A PH and Type-1 PH are reported in step 560. If the judge result of step 550 is NO, then in step 570, judging whether additional SRS is not configured but ul-Configuration-r14 is configured (without PUSCH/PUCCH). If the judge result of step 570 is YES, then Type-3 PH is reported in step 580. If the judge result of step 570 is NO, then Type-1 PH is reported in step 590.

| additional SRS | ul-Configuration-r14 | PUSCH/PUCCH | PH to be reported |
|---|---|---|---|
| configured | configured | configured | Type-3A and Type-1 |
| configured | configured | not configured | Type-3A and Type-3 |
| configured | not configured | configured | Type-3A and Type-1 |
| configured | not configured | not configured | Type-3A |
| not configured | configured | configured | Type-1 |
| not configured | configured | not configured | Type-3 |
| not configured | not configured | configured | Type-1 |

Figure 6:
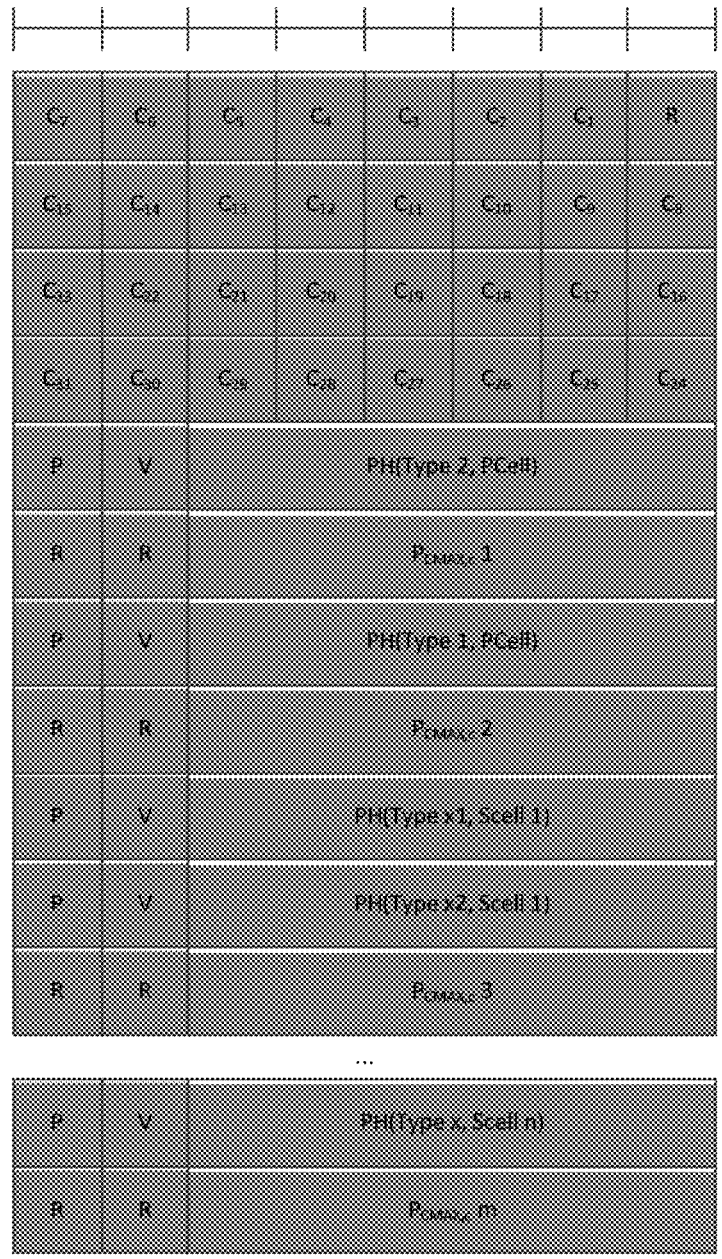
FIG. 6 illustrates an example of the Enhanced Extended PHR MAC CE format according to the third embodiment.

FIG. 6 illustrates an example of the Enhanced Extended PHR MAC CE format according to the third embodiment, in which Rule 3 is adopted.

In the example shown in FIG. 6, 32 serving cells are configured for the uplink transmission, in which one serving cell is PCell and the other thirty-one (31) serving cells are SCells. The PHR MAC CE is identified by a MAC PDU subheader with dedicated LCID. It has a variable size.

The definitions of the fields contained in Enhanced Extended PHR MAC CE shown in FIG. 6 are substantially the same as those described with reference to FIG. 2.

The first four octets indicate the presence of PH per SCell.

When Type-2 PH is reported for the PCell, the following octet contains a "P" field, a "V" field and a Type-2 PH field. When the "V" field in the this octet is set to "0", the next octet contains the "$P_{CMAX,c}$" field for the calculation of the preceding PH field (i.e. the Type-2 PH field)

The following octet contains a "P" field, a "V" field and a Type-1 PH field for the PCell. If the "V" field in this octet is set to 0, the next octet contains the "$P_{CMAX,c}$" field for the calculation of the preceding PH field (i.e. the Type-1 PH field).

The following octets are for the Type×PH field for the SCell and the associated $P_{CMAX,c}$ field (if reported), in an ascending order based on the ServCellIndex (in the condition that associated $C_i$ field is set to 1).

According to the third embodiment, x is equal to 3A when additional SRS is configured without ul-Configuration-r14 nor PUSCH/PUCCH for this SCell.

x has two values with x1 being equal to 3A and x2 being equal to 3 when both additional SRS and ul-Configuration-r14 are configured without PUSCH/PUCCH for this SCell. That is, two octets are necessary for reporting two PHs.

Similarly, x has two values with x1 being equal to 3A and x2 being equal to 1 when additional SRS is configured for a SCell with PUSCH/PUCCH.

x is equal to 3 when additional SRS is not configured but ul-Configuration-r14 is configured (without PUSCH/PUCCH).

x is equal to 1 for other situations. That is, PUSCH/PUCCH is configured but additional SRS is not configured.

Depending on the configuration of additional SRS and ul-Configuration-r14 for one SCell, when two PH values (e.g. Type-3A and Type 3, or Type 3A and Type 1) are reported, at most one associated $P_{CMAX,c}$ field can be reported for this SCell. If one of two V values is equals to 0, the $P_{CMAX,c}$ field associated with the reported PH with V=0 is presented. If both V values for two PH are equal to 0, the $P_{CMAX,c}$ field associated with both reported PH with V=0 is presented. If both V values for two PH is equal to 1, the octet containing the associated $P_{CMAX,c}$ field is omitted.

Figure 7:
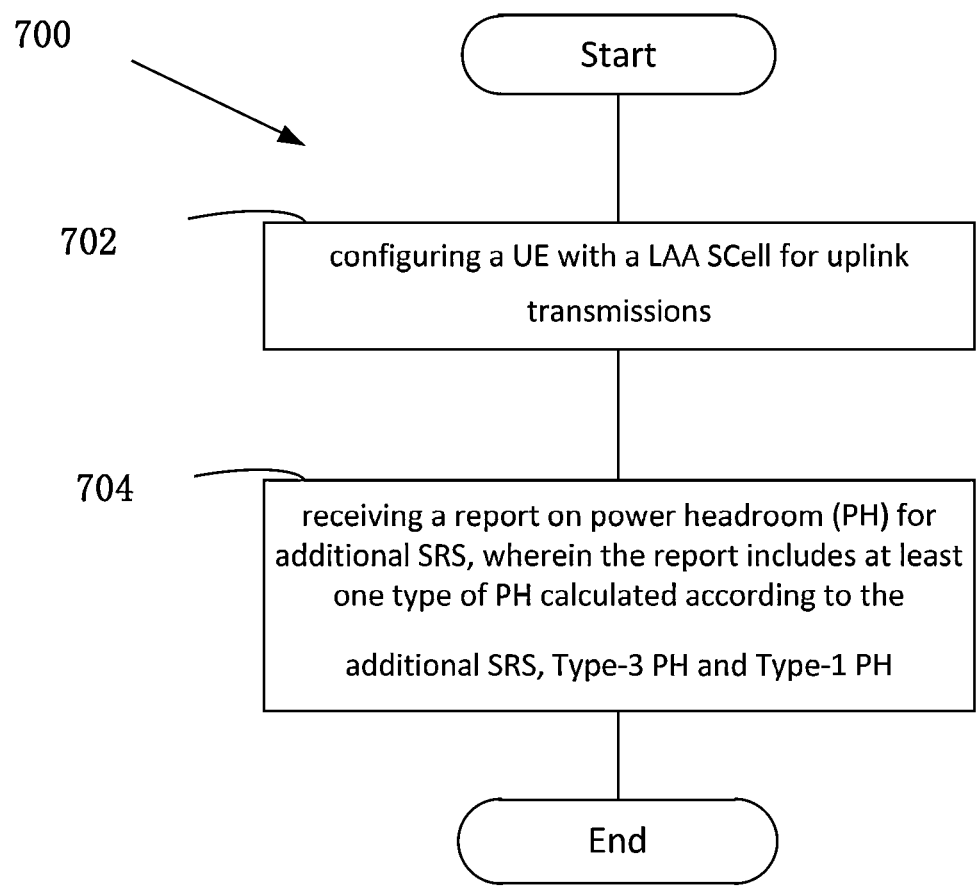
FIG. 7 is a schematic flow chart diagram illustrating an embodiment of a method for power headroom report for additional SRS.

FIG. 7 is a schematic flow chart diagram illustrating an embodiment of a method 700 for power headroom report for additional SRS. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include 702 configuring a UE with a LAA SCell for uplink transmissions. The method 700 may further include 704 receiving a report on power headroom (PH) for additional SRS, wherein the report includes at least one type of PH calculated according to the additional SRS, Type-3 PH and Type-1 PH. The above-described Tables 1-3 indicate the detailed implementation of the reported PH. Incidentally, the PH calculated according to the additional SRS is referred to as Type-3A PH.

Figure 8:
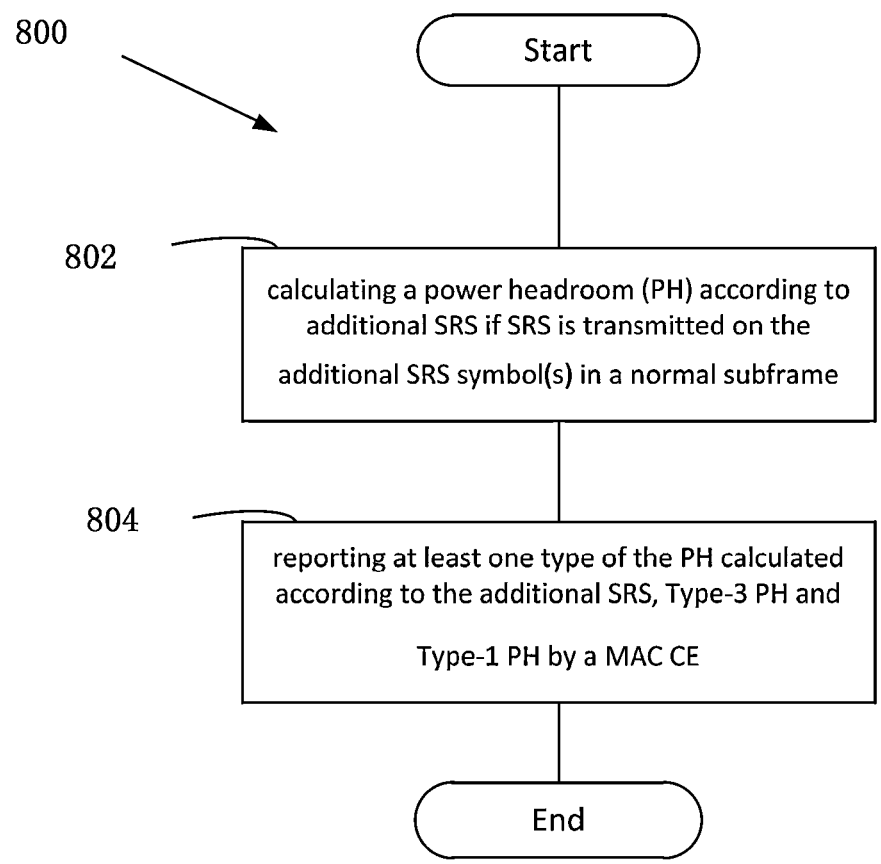
FIG. 8 is a schematic flow chart diagram illustrating a further embodiment of a method for power headroom report for additional SRS.

FIG. 8 is a schematic flow chart diagram illustrating a further embodiment of a method 800 for power headroom report for additional SRS. In some embodiments, the method 800 is performed by an apparatus, such as a remote unit or a UE. In certain embodiments, the method 800 may be performed by a processor executing program code, for example, a microcontroller, a microprocessor, a CPU, a GPU, an auxiliary processing unit, a FPGA, or the like.

The method 800 may include 802 calculating a power headroom (PH) according to additional SRS if SRS is transmitted on the additional SRS symbol(s) in a normal subframe and 804 reporting at least one type of the PH calculated according to the additional SRS, Type-3 PH and Type-1 PH by a MAC CE. The above-described Tables 1-3 indicate the detailed implementation of the reported PH. Incidentally, the PH calculated according to the additional SRS is referred to as Type-3A PH.

Figure 9:
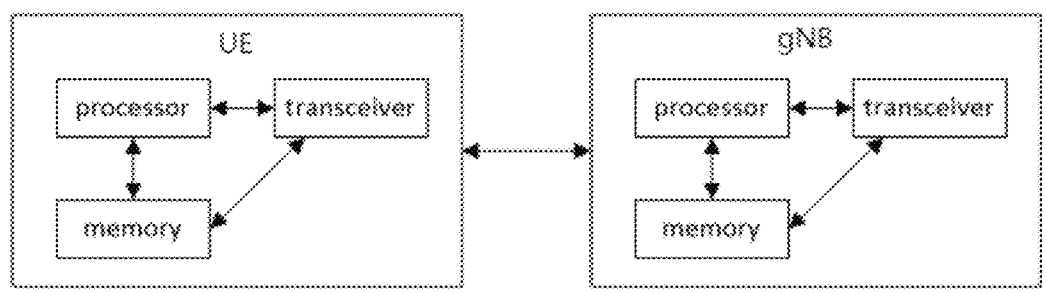
FIG. 9 is a schematic block diagram illustrating apparatuses according to one embodiment.

FIG. 9 is a schematic block diagram illustrating apparatuses according to one embodiment.

Referring to FIG. 9, the UE (i.e. remote unit) includes a processor, a memory, and a transceiver. The processor implements a function, a process, and/or a method which are proposed in FIG. 8. The gNB (i.e. base unit) includes a processor, a memory, and a transceiver. The processors implement a function, a process, and/or a method which are proposed in FIG. 7. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   calculating a power headroom (PH) according to an additional sounding reference signal (SRS) based at least in part on SRS being transmitted on one or more additional SRS symbols in a normal subframe; and
   reporting, for a secondary cell (SCell) via a media access control (MAC) control element (CE), at least one type of the PH calculated according to the additional SRS, Type-3 PH and Type-1 PH, wherein the at least one type of the PH calculated according to the additional SRS is reported if the additional SRS is configured for the SCell, the at least one type of the PH calculated according to the Type-3 PH is reported if the additional SRS is not configured but ul-Configuration-r14 Is configured for this SCell, and the at least one type of the PH calculated according to the Type-1 PH is reported if one or more of a physical uplink shared channel (PUSCH) or a physical uplink control channel (PUCCH) is configured.

2. The method of claim 1, wherein the UE is configured with a license-assisted access (LAA) SCell for uplink transmissions, the method further comprising receiving physical downlink control channel (PDCCH) or enhanced PDCCH (EPDCCH) to schedule an aperiodic SRS transmission on the one or more additional SRS symbols on the LAA SCell in subframe I,
wherein the power headroom according to the additional SRS for subframe i is calculated assuming that the UE performs an aperiodic additional SRS transmission on the LAA SCell in subframe a irrespective of whether the LAA SCell for the additional SRS transmission is accessible to the UE in subframe i.

3. The method of claim 1, wherein the Type-3 PH is reported for the SCell if ul-Configuration-r 14 is configured for this SCell,
the PH calculated according to the additional SRS is reported for the SCell if ul-Configuration-r14 is not configured but the additional SRS is configured for this SCell without one or more of the PUSCH or the (PUCCH) PUCCH, and
the Type-1 PH is reported for the SCell if the one or more of the PUSCH or the PUCCH is configured.

4. The method of claim 1, wherein the PH calculated according to the additional SRS is reported for the SCell if the additional SRS is configured for this SCell without one or more of the PUSCH or the PUSCH nor ul-Configuration-r14,
both the Type-3 PH and the PH calculated according to the additional SRS are reported for the SCell if both the additional SRS and ul-Configuration-r14 are configured for this SCell without the one or more of the PUSCH or the PUCCH,
both the PH calculated according to the additional SRS and the Type-1 PH are reported for the SCell if the additional SRS is configured for this SCell with the one or more of the PUSCH or the PUCCH,
the Type-3 PH is reported for the SCell if the additional SRS is not configured but ul-Configuration-r14 is configured for this SCell, and
the Type-1 PH is reported for the SCell if the additional SRS is not configured but the one or more of the PUSCH or the PUCCH is configured for this SCell.

5. The method of claim 4, wherein when two PH values are reported for one SCell, at most one associated $P_{CMAX,c}$ field for one of or both PH values is reported.

6. The method of claim 1, wherein:
the PH calculated according to the additional SRS is calculated using $PH_{type3A,c}(i) = P_{CMAX,c}(i) - \{10 \log_{10}(M_{Additional\_SRS,c}) + P_{O\_(Additional\_SRS,c)} + \alpha_{Additional\_SRS,c} \cdot PL_c + f_{Additional\_SRS,c} \cdot PL_c + f_{Additional\_SRS,c}(i)\}$ if the UE transmits the additional SRS in a normal subframe i for serving cell c with frame structure Type-1 and/or Type-2 and/or Type-3; and
using $PH_{type3A,c}(i) = \tilde{P}_{CMAX,c}(i) - \{P_{O\_(Additional\_SRS,c)} + \alpha_{Additional\_SRS,c} \cdot PL_c + f_{Additional\_SRS,c} \cdot PL_c + f_{Additional\_SRS,c}(i)\}$ if the UE does not actually transmit the additional SRS,
wherein,
$P_{CMAX,c}(i)$ is a configured UE maximum transmit power in subframe i for serving cell c,
$P_{O\_Additional\_SRS,c}$ is a parameter composed of a sum of a component $P_{O\_Additional\_Normal\_SRS,c}$ and a component $P_{O\_UE\_Additional\_SRS,c}$ configured by a higher layer parameter p0-Nominal-additionalSRS and p0-UE-additionalSRS for the additional SRS,
$M_{Additional\_SRS,c}$ is a bandwidth for transmission of the additional SRS in subframe i for serving cell c expressed in number of resource blocks (RBs),
$\alpha_{Additional\_SRS,c}$ is a value of higher layer parameter alpha-additionalSRS configured by higher layers for serving cell c,
$PL_c$ is a downlink path loss estimate calculated in the UE for serving cell c in dB,
$f_{Additional\_SRS,c}(i)$ is a current SRS power control adjustment state determined a transmit power control (TPC) command carried by downlink control information (DCI) format 3/3A/3B, and
$\tilde{P}_{CMAX,c}(i)$ is calculated assuming a SRS transmission in subframe i, and assuming MPR (Maximum Power Reduction)=0 dB, A-MPR (Additional Maximum Power Reduction)=0 dB, P-MPR (Power Management Maximum Power Reduction)=0 dB and TC=0 dB.

7. A user equipment (UE) for wireless communication, comprising:
at least one memory; and
at least one processor coupled with the at least one memory and configured to cause the UE to:
calculate a power headroom (PH) according to an additional sounding reference signal (SRS) based at least in part on SRS being transmitted on one or more additional SRS symbols in a normal subframe; and
report, for a secondary cell (SCell) via a media access control (MAC) control element (CE), at least one type of the PH calculated according to the additional SRS, Type-3 PH and Type-1 PH, wherein the at least one type of the PH calculated according to the additional SRS is reported if the additional SRS is configured for the SCell, the at least one type of the PH calculated according to the Type-3 PH is reported if the additional SRS is not configured but ul-Configuration-r14 is configured for this SCell, and the at least one type of the PH calculated according to the Type-1 PH is reported if one or more of a physical uplink shared channel (PUSCH) or a physical uplink control channel (PUCCH) is configured.

8. The UE of claim 7, wherein the UE is configured with a license-assisted access (LAA) SCell for uplink transmissions,
wherein the at least one processor is configured to cause the UE to receive physical downlink control channel (PDCCH) or enhanced PDCCH (EPDCCH) to schedule an aperiodic SRS transmission on the one or more additional SRS symbols on the LAA SCell in subframe i,
wherein the power headroom according to the additional SRS for subframe i is calculated assuming that the UE performs an aperiodic additional SRS transmission on the LAA SCell in subframe i irrespective of whether the UE can access the LAA SCell for the additional SRS transmission in subframe i.

9. The UE of claim 7, wherein the Type-3 PH is reported for the SCell if ul-Configuration-r14 is configured for this SCell,
the PH calculated according to the additional SRS is reported for the SCell if ul-Configuration-r14 is not configured but the additional SRS is configured for this SCell without one or more of the PUSCH or the PUCCH, and
the Type-1 PH is reported for the SCell if the one or more of the PUSCH or the PUCCH is configured.

10. The UE of claim 7, wherein the PH calculated according to the additional SRS is reported for the SCell if the additional SRS is configured for this SCell without one or more of the PUSCH or the PUCCH nor ul-Configuration-r14, both the Type-3 PH and the PH calculated according to the additional SRS are reported for the SCell if both the additional SRS and ul-Configuration-r14 are configured for this SCell without the one or more of the PUSCH or the PUCCH, both the PH calculated according to the additional SRS and the Type-1 PH are reported for the SCell if the additional SRS is configured for this SCell with the one or more of the PUSCH or the PUCCH, the Type-3 PH is reported for the SCell if the additional SRS is not configured but ul-Configuration-r14 is configured for this SCell, and the Type-1 PH is reported for the SCell if the additional SRS is not configured but the one or more of the PUSCH or the PUCCH is configured for this SCell.

11. The UE of claim 10, wherein when two PH values are reported for one SCell, at most one associated $P_{CMAX,c}$ field for one of or both PH values is reported.

12. The UE of claim 7, wherein;

the PH calculated according to the additional SRS is calculated using $PH_{type3A,c}(i) = P_{CMAX,c}(i) - \{10 \log_{10}(M_{Additional\_SRS,c}) + P_{O\_(Additional\_SRS,c)} + \alpha_{Additional\_SRS,c} \cdot PL_c + f_{Additional\_SRS,c}(i)\}$ if the UE transmits the additional SRS in a normal subframe i for serving cell c with frame structure Type-1 and/or Type-2 and/or Type-3; and using $PH_{type3A,c}(i) = \tilde{P}_{CMAX,c}(i) - \{P_{O\_(Additional\_SRS,c)} + \alpha_{Additional\_SRS,c} \cdot PL_c + f_{Additional\_SRS,c}(i)\}$ if the UE does not actually transmit the additional SRS, wherein, $P_{CMAX,c}(i)$ is a configured UE maximum transmit power in subframe i for serving cell c, $P_{O\_Additional\_SRS,c}$ is a parameter of a sum of a component $P_{O\_Additional\_Normal\_SRS,c}$ and a component $P_{O\_UE\_Additional\_SRS,c}$ configured by a higher layer parameter p0-Nominal-additionalSRS and p0-UE-additionalSRS for the additional SRS, $M_{Additional\_SRS,c}$ is a bandwidth for transmission of the additional SRS in subframe i for serving cell c expressed in number of resource blocks (RBs), $\alpha_{Additional\_SRS,c}$ is a value of higher layer parameter alpha-additionalSRS configured by higher layers for serving cell c, $PL_c$ is a downlink path loss estimate calculated in the UE for serving cell c in dB, $f_{Additional\_SRS,c}(i)$ is a current SRS power control adjustment state determined by a transmit power control (TPC) command carried by DCI format 3/3A/3B, and $P_{CMAX,c}(i)$ is calculated assuming a SRS transmission in subframe i, and assuming MPR (Maximum Power Reduction)=0 dB, A-MPR (Additional Maximum Power Reduction)=0 dB, P-MPR (Power Management Maximum Power Reduction)=0 dB and TC=0 dB.

13. A base unit for wireless communication, comprising:

at least one memory; and at least one processor coupled with the at least one memory and configured to cause the base unit to:

configure a user equipment (UE) with a license-assisted access (LAA) special cell for uplink transmissions; and receive a report on power headroom (PH) for an additional sounding reference signal (SRS), wherein the report includes at least one type of PH calculated according to the additional SRS, Type-3 PH and Type-1 PH, wherein the report comprises the at least one type of PH calculated according to the additional SRS for a secondary cell (SCell) if the additional SRS is configured for the SCell, the at least one type of the PH calculated according to the Type-3 PH is reported if the additional SRS is not configured but ul-Configuration-r14 is configured for this SCell, and the at least one type of the PH calculated according to the Type-1 PH is reported if one or more of a physical uplink shared channel (PUSCH) or a physical uplink control channel (PUCCH) is configured.

14. The base unit of claim 13, wherein the at least one processor is configured to cause the base unit to transmit physical downlink control channel (PDCCH) or enhanced PDCCH to schedule an aperiodic SRS transmission on one or more additional SRS symbols on the LAA SCell in subframe i.

15. The base unit of claim 13, wherein the Type-3 PH is reported for the SCell if ul-Configuration-r14 is configured for this SCell, the PH calculated according to the additional SRS is reported for the SCell if ul-Configuration-r14 is not configured but the additional SRS is configured for this SCell without one or more of the PUSCH or the PUCCH, and the Type-1 PH is reported for the SCell if the one or more of the PUSCH or the PUCCH is configured.

16. The base unit of claim 13, wherein the PH calculated according to the additional SRS is reported for the SCell if the additional SRS is configured for this SCell without one or more of the PUSCH or the PUCCH nor ul-Configuration-r14, both the Type-3 PH and the PH calculated according to the additional SRS are reported for the SCell if both the additional SRS and ul-Configuration-r14 are configured for this SCell without the one or more of the PUSCH or the PUCCH, both the PH calculated according to the additional SRS and Type-1 PH are reported for the SCell if the additional SRS is configured for this SCell with the one or more of the PUSCH or the PUCCH, the Type-3 PH is reported for the SCell if the additional SRS is not configured but ul-Configuration-r14 is configured for this SCell, and the Type-1 PH is reported for the SCell if the additional SRS is not configured but the one or more of the PUSCH or the PUCCH is configured for this SCell.

17. A processor for wireless communication, comprising:

at least one controller coupled with at least one memory and configured to cause the processor to:

calculate a power headroom (PH) according to an additional sounding reference signal (SRS) based at least in part on SRS being transmitted on one or more additional SRS symbols in a normal subframe; and report, for a secondary cell (SCell) via a media access control (MAC) control element (CE), at least one type of the PH calculated according to the additional SRS, Type-3 PH and Type-1 PH, wherein the at least one type of the PH calculated according to the additional SRS is reported if the additional SRS is configured for the SCell, the at least one type of the PH calculated according to the Type-3 PH is reported if the additional SRS is not configured but ul-Configuration-r14 Is configured for this SCell, and the at least one type of the PH calculated according to the Type-1 PH is reported if one or more of a physical uplink shared channel (PUSCH) or a physical uplink control channel (PUCCH) is configured.

* * * * *